March 28, 1939.  A. J. HOLMAN  2,151,700
SOUND PICK-UP UNIT
Filed Dec. 20, 1934  3 Sheets-Sheet 3
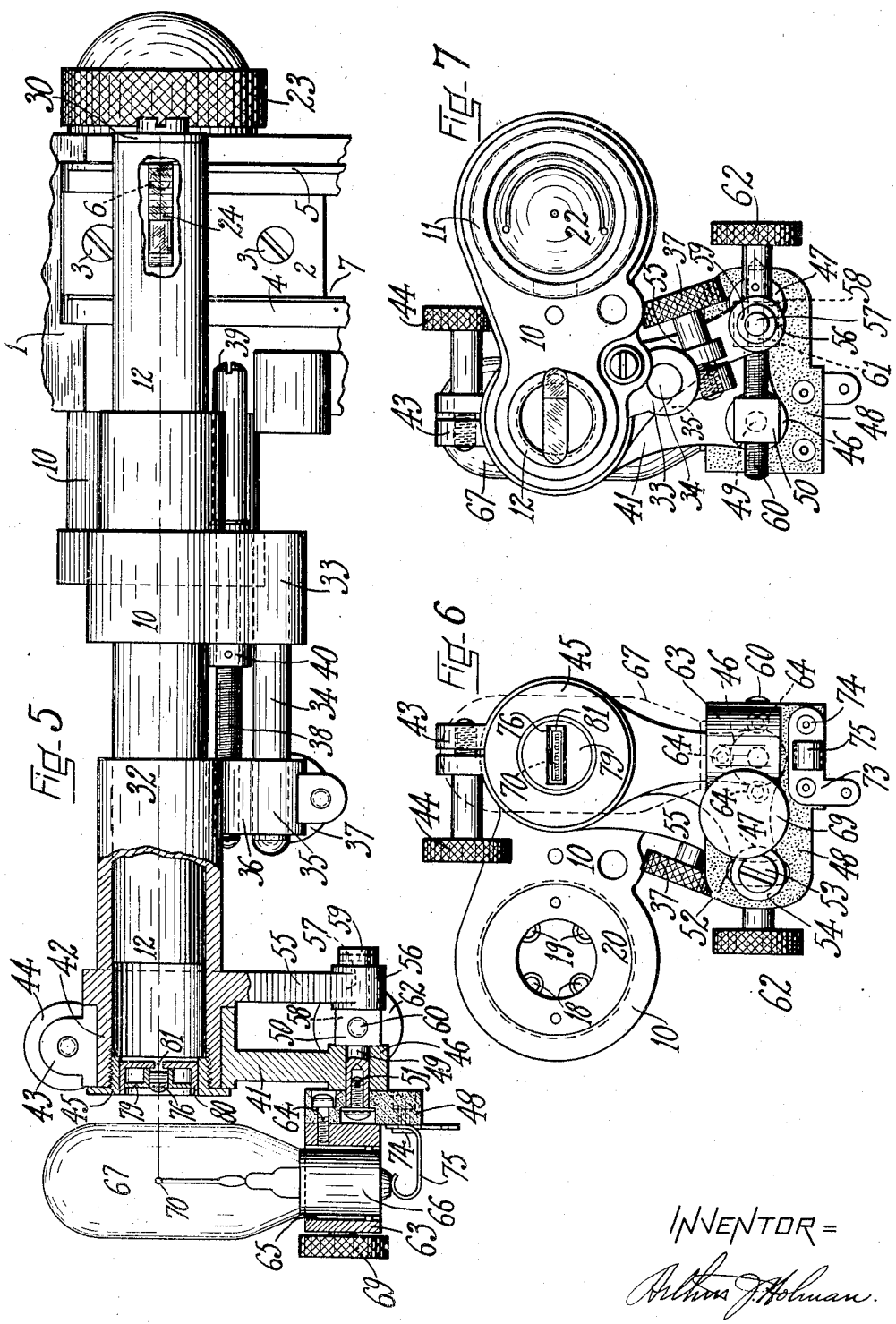
INVENTOR =
Arthur J. Holman.

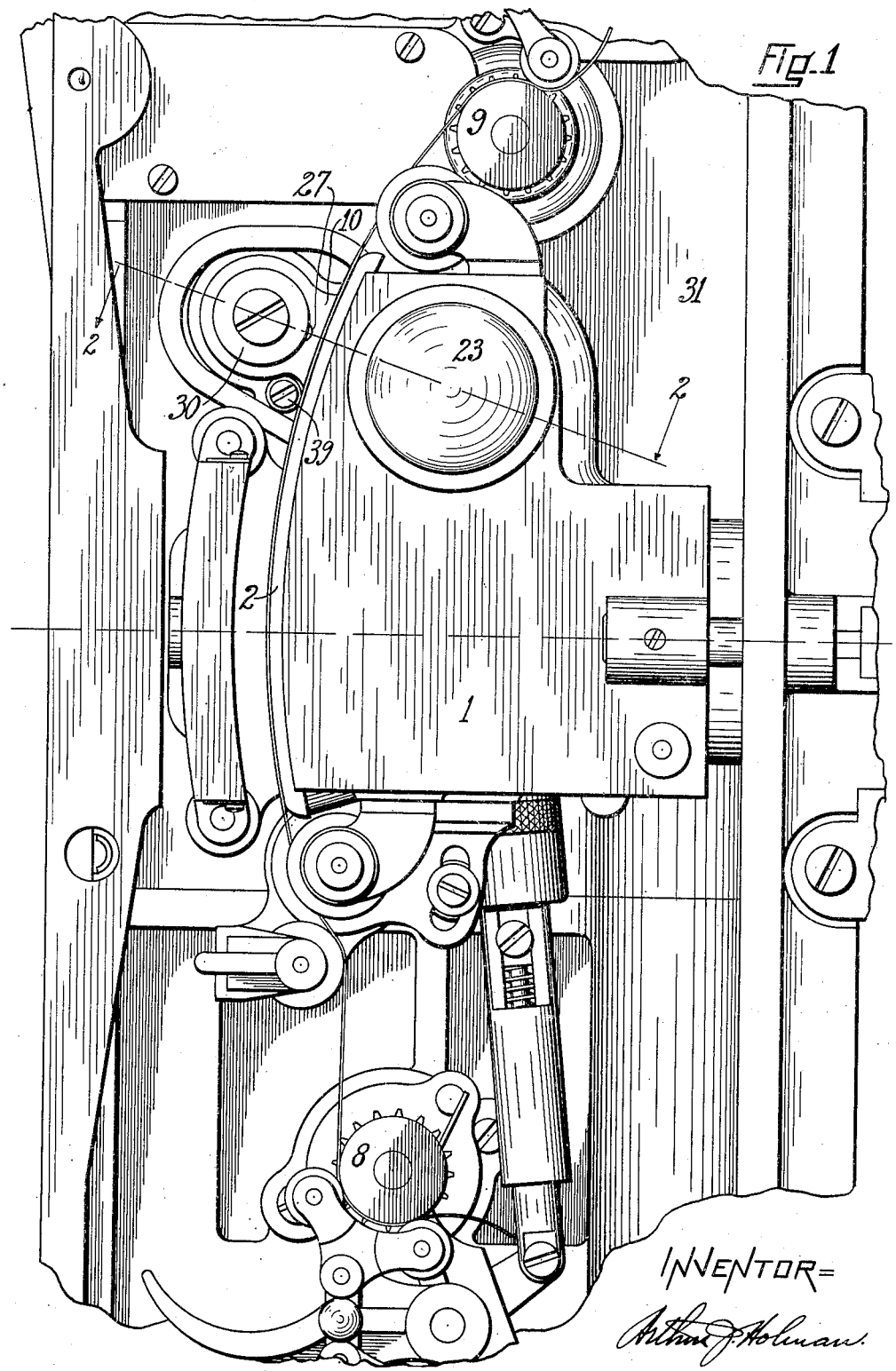

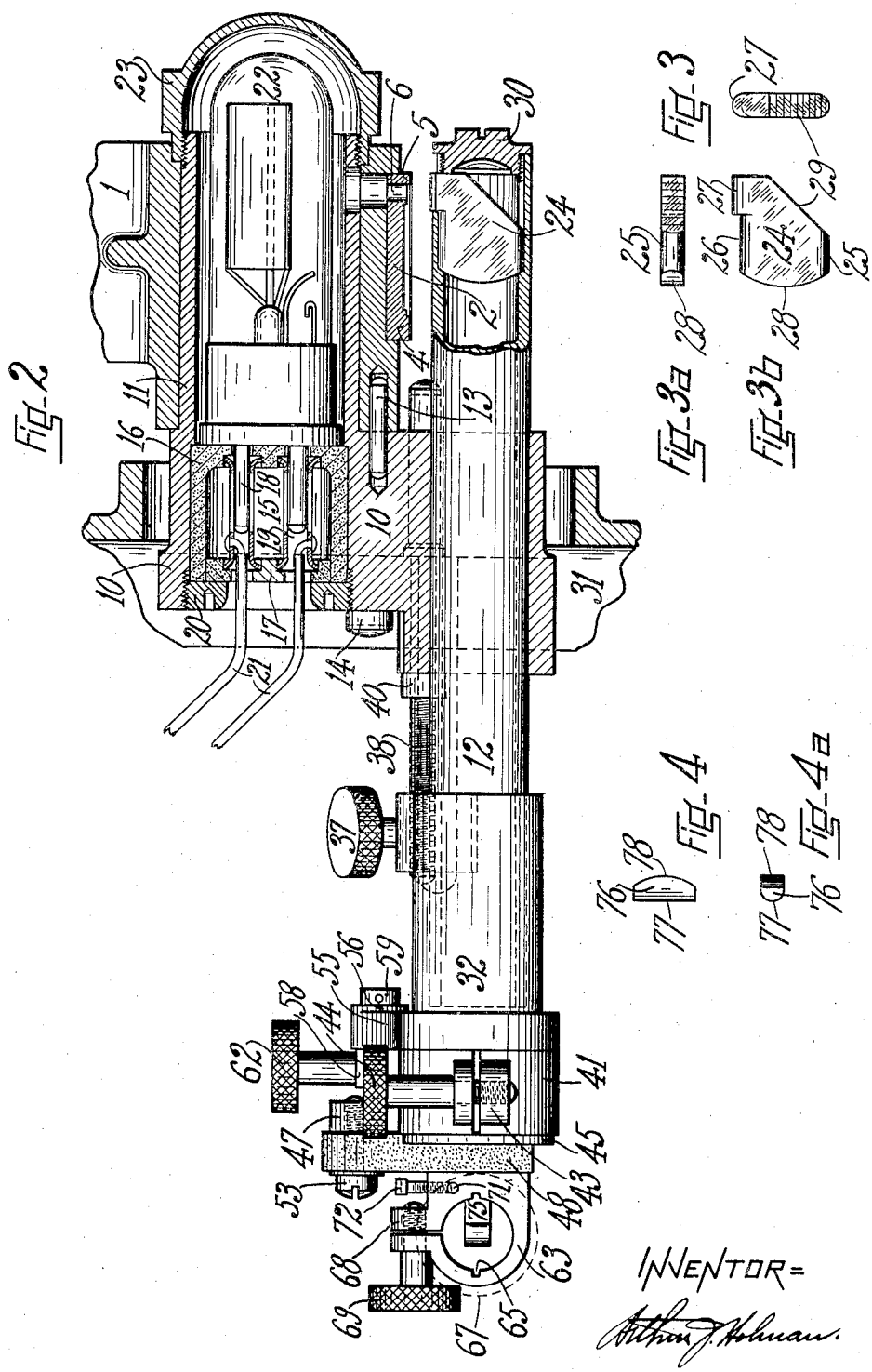

Patented Mar. 28, 1939

2,151,700

UNITED STATES PATENT OFFICE 2,151,700

SOUND PICK-UP UNIT

Arthur J. Holman, East Orange, N. J.

Application December 20, 1934, Serial No. 758,429

19 Claims. (Cl. 179—100.3)

My invention relates to a sound pick-up unit including an exciter lamp, an exciter optical system, a photo-electric cell, and means whereby these elements may be suitably supported and easily adjusted with respect to the sound track passing over the sound aperture plate of a motion picture projector. The present unit is a convenient and compact mechanical structure for supporting the exciter system described in Letters Patent of the United States, No. 2,036,276, dated April 7, 1936, and is designed to be used with the sound and picture aperture unit and film feeding mechanism described in Letters Patent of the United States No. 2,120,249. It has been the object of my invention to combine the photo-electric cell, the exciter system and means for adjusting the latter, into a single unit which may be accurately adjusted before being inserted into the projector mechanism, and which may be easily and quickly removed or replaced without disturbing its adjustment. It has been the further object to provide an exciter optical system wherein all refracting surfaces are cylindrical in form, as distinguished from the sphero-cylindrical elements described in the Letters Patent above referred to. Cylindrical refracting surfaces arranged with their axes crossed at right angles, offer certain advantages over sphero-cylindrical combinations as will be hereinafter fully described.

It has also been my object to locate the sound pick-up unit at such position within the film feeding mechanism that the portion of the film strip passing through the sound pick-up unit will be under tension, the tension being applied by sprockets above and below the unit, the lower sprocket being power driven, and the upper sprocket being film actuated against a constant drag. A film strip so propelled and so stressed is not subject to irregular movement as the sprocket teeth engage within the perforations in the film, the resiliency of the film bridges between the perforations acting at each sprocket to neutralize the irregularities generated at the other sprocket.

My invention may be best understood by reference to the accompanying drawings in which—

Fig. 1 is a view into the operating side of a non-intermittent projector mechanism, showing the aperture unit whereon is mounted the sound pick-up unit, and the film feeding mechanism associated therewith.

Fig. 2 is a section on line 2—2 of Fig. 1, showing parts of the aperture unit, mechanism main frame, and the sound unit and its supporting member, the exciter tube being sectioned only to show the objective.

Figs. 3, 3a and 3b show three views of the exciter objective which is provided with two cylindrical refracting surfaces.

Figs. 4 and 4a show two views of the condenser which is provided with two cylindrical refracting surfaces.

Fig. 5 is a rear elevation of the complete sound pick-up unit taken in a plane at right angles to the plane through line 2—2 of Fig. 1, showing a portion of the aperture unit, the exciter tube being sectioned at one end to show the condenser and method of mounting the exciter lamp, and broken away at the other end to show the objective.

Fig. 6 is a view of the left end of the sound pick-up unit shown in Fig. 5, the exciter lamp and its filament being shown in broken lines.

Fig. 7 is a view of the right end of the sound pick-up unit shown in Fig. 5, the screw caps being removed to show the objective and the photo-electric cell.

Referring now more specifically to the drawings, in which like reference numerals indicate like parts, I is the aperture unit which is slidably mounted within the projector mechanism in the manner fully described in Letters Patent No. 2,120,249, above referred to. The aperture plate 2 (Figs. 1, 2 and 5) is attached to aperture unit I by the screws 3, and has the integral raised curved tracks 4 and 5, the latter being narrow and positioned to contact with the film along one edge outside of the sound track which overlies the sound aperture 6 in aperture plate 2. The picture aperture 7, which lies below sound aperture 6, is positioned centrally in aperture plate 2.

Associated with aperture unit I is aperture feed sprocket 8, which is power driven, and fire shutter control sprocket 9, which is film actuated. The movement of the film over aperture plate 2 is subject only to the forces applied to the film by the sprockets 8 and 9, the sprocket 8 exerting just sufficient force on the film to overcome the drag of sprocket 9 plus the slight friction of the film against aperture plate 2, the latter being a small factor compared with the drag of sprocket 9. It is highly important that the film carrying the sound track be operated through the sound pick-up unit at a constant velocity, and the above described arrangement for controlling the film movement provides a superior means for damping out the ripples inherent in and inseparable from the movement of film which is sprocket actuated through a film trap, i. e., through a means which applies frictional drag directly on the film strip. Reference is herein made to the film feeding mechanism to point out one of the great advantages of mounting the sound pick-up unit on the aperture unit of applicant's non-intermittent projector.

The sound pick-up unit is carried by the supporting member 10, (Figs. 2, 5 and 7) an integral annular portion 11 of which projects through and fits with slight clearance within the bore in the upper portion of aperture unit 1. The opposite end of supporting member 10 contains a bore parallel to the axis of annular portion 11, and within this bore is press fitted the exciter tube 12. A dowel pin 13, press fitted into aperture unit 1, and projecting into supporting member 10, serves to properly align exciter tube 12 with sound aperture 6 as supporting member 10 is pushed into position on aperture unit 1, and the screw 14, passing through member 10 and threaded into the aperture unit, retains supporting member 10 in position on the aperture unit.

Within supporting member 10, and aligned with the axis of integral annular portion 11, is mounted the base 15, (Fig. 2) suitable for supporting and making electrical connection with the usual four-pronged photo-electric cell. The base 15 comprises a moulded insulating body 16, an insulating end portion 17, two metallic tubes 18, and two metallic tubes 19 of somewhat larger diameter, the belled ends of tubes 18 and 19 fitting into suitable cavities in the insulating members, the complete base being held together and in proper position within supporting member 10 by the threaded retaining collar 20, which presses insulating member 16 against a shoulder at the base of annular portion 11 of supporting member 10. The tubes 18 and 19 are made of a non-corroding spring material such as hard drawn brass or bronze nickel plated, and are slitted lengthwise, the slitted portions being sprung inwardly to provide good electrical contact with the prongs of the photoelectric cell. The base 15 may be held together by one or more rivets passing through the body 16 and the end portion 17 in the direction parallel to the axis of tubes 18 and 19. Lead-in wires 21, soldered in tubes 18 and 19, connect with suitable amplifying apparatus. The prongs of the photo-electric cell 22 are pushed into base 15, which retains the cell 22 in position within annular portion 11 of supporting member 10, and the threaded knurled cap 23 screws over the threaded end of annular portion 11, serving the double purpose of rigidly clamping supporting member 10 to aperture unit 1 and sealing the photo-electric cell 22 from all light except that which passes through sound aperture 6. Aperture unit 1 and annular portion 11 of supporting member 10 each contains a bore in alignment with sound aperture 6 in aperture plate 2, the bores being progressively larger in diameter toward the photo-electric cell to provide free passage for the expanding light beam.

Exciter tube 12 projects outwardly from supporting member 10 to a position slightly beyond sound aperture 6, (Figs. 2, 5 and 7) and the end is slotted opposite sound aperture 6 and the side walls are milled out to receive the exciter objective 24. As shown in Fig. 3, objective 24 is essentially a flat plate of optical glass about $\frac{7}{16}$ inch thick, the sides 25 and 26 parallel the axis of exciter tube 12, being ground or moulded to a radius which exactly fits the milled grooves in the walls of exciter tube 12, thereby providing means for retaining objective 24 in correct alignment with the axis of the exciter tube and the sound aperture 6. The surface 27, which projects beyond the side 26, is ground and polished to a true cylindrical surface, the axis being parallel to the axis of the exciter tube 12, and the radius of curvature being somewhat greater than half the thickness of the plate of optical glass. The inner end 28 is ground and polished to a true cylindrical surface, the axis of this surface intersecting the axis of the exciter tube at right angles and also being perpendicular to the faces of the plate of optical glass of which the objective is made. The radius of cylindrical surface 28 is such as to form an image of the exciter lamp filament on the film of sufficient length to cover the width of the sound track. The end 29 is beveled at 45 degrees and an optically flat surface is provided in such position with respect to cylindrical surface 27, that the axial ray entering cylindrical surface 28 will be turned at right angles and leave the objective as the axial ray through cylindrical surface 27. The milled grooves in the walls of exciter tube 12 extend to such distance from the end of the tube as to position objective 24 so that the above mentioned axial ray, emerging from cylindrical surface 27, passes along the axis of sound aperture 6. All parts of the objective, excepting the three optical surfaces, are preferably painted flat black to absorb internal reflections, and the optical flat is preferably silvered to increase its reflecting power. The end of exciter tube 12 is threaded internally and a threaded cap 30 is screwed therein to retain objective 24 in position and to seal one end of the exciter tube.

Supporting member 10 projects from the aperture unit 1 through a clearance hole in mechanism frame member 31 (Fig. 2) into the compartment wherein is housed the sprocket operating mechanism. Exciter tube 12 projects from supporting member 10 into this compartment, and carries focusing bracket 32, (Figs. 2 and 5) which is a good sliding fit on exciter tube 12. A boss 33 (Figs. 5 and 7) integral with supporting member 10, has press fitted therein a stud 34, which parallels exciter tube 12 and projects through the split clamp 35 on boss 36, the latter being integral with focusing bracket 32. Split clamp 35 slides freely over stud 34 when the knurled headed clamp screw 37 is loosened, but the fit of focusing bracket 32 on exciter tube 12 and on stud 34 is sufficiently good to prevent rotation of the focusing bracket on the exciter tube. The focusing screw 38 enters a threaded bore in boss 36 integral with focusing bracket 32, and turns freely in a bore through supporting member 10, the long head 39 of focusing screw 38 extending out over aperture unit 1 where it is easily reached by a screw driver from the operating side of the projector mechanism. An integral collar on focusing screw 38 contacts with one face of supporting member 10, and the collar 40, pinned to focusing screw 38, contacts with the opposite face of supporting member 10, thereby effectively preventing end play in the focusing screw.

The exciter lamp bracket 41 (Figs. 2, 5 and 6) fits over a turned portion 42 on focusing bracket 32 and is provided with a split clamp 43 and a knurled headed clamp screw 44 by means of which it may be locked in any desired angular position on the focusing bracket. The threaded flanged sleeve 45 screws into the end of focusing bracket 32 and retains exciter lamp bracket 41 in position against the shoulder on the focusing bracket. Exciter lamp bracket 41 has two integral bosses 46 and 47 (Figs. 6 and 7) at it lower end, to which is attached the insulating block 48 in the following manner: A stud 49 having the square head 50, fits with slight clearance in a bore in the boss 46 and projects through a bore of the same diameter in insulating block 48. A counterbore in block 48 provides a shoulder against which presses a washer which is retained in position against the end of stud 49 by the screw 51 threaded into stud 49. The head 50 on stud 49 contacts with one face of boss 46 and the insulating block 48 contacts with the opposite face thereof, thus providing a snug hinge mounting of the block 48 on exciter lamp bracket 41. The opposite end of insulating block 48 is slotted as shown at 52 (Fig. 6) and a lock screw 53, provided with washer 54, projects through insulating block 48 and is threaded into boss 47 on exciter lamp bracket 41, thereby providing means for securing the insulating block 48 to the exciter lamp bracket in any desired angular position.

An arm 55 integral with focusing bracket 32, carries the boss 56 at its lower extremity, and the stud 57, having the square head 58, is a snug turning fit in the bore in boss 56. The head 58 of stud 57 contacts with one face of boss 56, and a collar 59, pinned on stud 57, contacts with the opposite face, thereby preventing end play in the stud. The square head 50 on stud 49, which is rotatable in boss 46 on exciter lamp bracket 41, is tapped to receive the adjusting screw 60. A portion 61 of reduced diameter projecting from one end of screw 60, fits with slight clearance within a bore in the square head 58 of stud 57 and is retained therein by knurled wheel 62, the hub of which is bored to fit over portion 61 of screw 60 and is pinned thereto in position to prevent end play in screw 60.

The exciter lamp socket 63 (Figs. 2, 5 and 6) is attached to insulating block 48 by three screws 64, the heads of which enter counterbores in block 48, thus effectively insulating socket 63 from exciter lamp bracket 41. These counterbores may be filled with sealing wax, after the manner of ordinary practice in electric socket manufacture, to prevent the screws from becoming loosened. Slots 65 are provided in socket 63 to receive the aligning pins on the base 66 of the exciter lamp 67, and socket 63 is provided with the split clamp 68 and the knurled headed clamp screw 69, by means of which exciter lamp 67 may be clamped at such position in socket 63 as to bring the coil filament 70 in alignment with the axis of exciter tube 12. A hole 71 drilled through socket 63, and the screw 72 provide means for attaching one lead wire to the socket 63. The second lead wire carrying current to the exciter lamp 67, may be attached to a lug on spring clip 73 (Figs. 5 and 6) which is itself attached to insulating block 48 by hollow rivets 74, and is provided with the contact clip 75 which presses against the central terminal on base 66 of exciter lamp 67.

A condenser lens 76 (Figs. 4, 5 and 6) made of optical glass approximately $\frac{1}{16}$ inch thick, is provided with an optical cylindrical surface 77 on one side, which is ½ inch in length, the axis of this surface being parallel to the faces of the blank and the radius of curvature being slightly greater than half the thickness of the blank. The opposite face 78 is also an optical cylindrical surface, the axis being perpendicular to the faces of the blank and being symmetrically positioned with respect to the cylindrical surface 77, the radius of curvature being several times greater than that of surface 77. The crossed-cylinder condenser lens 76 is mounted within the threaded flanged sleeve 45 (after the latter has been screwed home in focusing bracket 32) in such position that the axis of cylindrical surface 77 lies in the plane containing the axis of exciter tube 12 and the axis of sound aperture 6, the axis of cylindrical surface 78 intersecting the axis of exciter tube 12 at right angles. Condenser 76 is retained in this position by mount 79, which is secured in the flanged diaphragm member 80, the latter containing the long narrow opening 81, and being press fitted into flanged sleeve 45. The opening 81 has a width approximately twice the diameter of coil filament 70, and a length approximately 50 percent greater than that of the coil filament, and functions merely as a field aperture to cut off undesirable reflected light, and not as an optical slit to be imaged on the sound track.

As in the case of the exciter system described in the Letters Patent hereinabove referred to, it is the function of my present system to form a highly compressed line image of the coil filament over the sound track on the film strip. It is the function of the crossed-cylinder condenser to collect and converge into the objective as much light from the coil filament as the objective can use effectively to form a highly concentrated bright line image of the filament upon the sound track of the film. The diaphragm member 80 is provided to reduce the amount of light reaching the objective by reflection from areas on the surface of the exciter lamp bulb, which light, because of its origin outside of the plane of focus of the objective, would cause deterioration of the scanning line by introducing flare and halo effects. The refracting powers of the cylindrical surfaces are so proportioned that the condenser, when properly positioned with respect to the coil filament, projects a narrow, clean band of light into the objective. A crossed-cylinder condenser produces a light beam which is entirely free from spherical aberration, hence it is superior to a sphero-cylindrical condenser in that it enables the objective to form a cleaner and sharper image of the coil filament.

The crossed-cylinder objective of the type hereinabove described, is likewise free from spherical aberration, and it also possesses another important advantage over the sphero-cylindrical objective described in my former application. If the surface 28 were spherical (as it is in a sphero-cylindrical objective) refraction at this surface tending to narrow the filament image is cumulative with that at the cylindrical surface 27, hence the equivalent center of the total refracting power producing the maximum image squeeze, lies within the objective and is further from the cylindrical surface 27 the greater the spherical refracting power. When the spherical refracting power is sufficient to form the correct length scanning line, its magnitude is so great with respect to the cylindrical refracting power, that the equivalent center of the total refracting power producing maximum image squeeze, is some considerable distance within the objective, and this results in a very short "back focus", i. e., small clearance between the objective and the film, which is objectionable, but, what is more serious, it greatly reduces the practical filament-to-image reduction ratio. This is true because the diameter of coil filament to width of scanning line ratio, is determined entirely by the location, with respect to the filament and its image, of the equivalent center of the total refracting power producing maximum image squeeze. The crossed-cylinder objective has its center of refracting power producing maximum image squeeze, on the optical axis of the objective at the point where the axis pierces cylindrical surface 27, which is obviously the condition producing maximum clearance between objective and film, and also providing the greatest filament-diameter-to-scanning-line-with reduction ratio, for a given clearance and a given total distance between film and filament. This, with the complete elimination of spherical aberration, makes the present exciter optical system superior to my former invention. The crossed-cylinder optical system provides the finest and brightest scanning line having the cleanest edges and maximum contrast from its back ground. Uncorrected crossed cylinders are satisfactory, but further refinement may be secured by acromatizing the objective in a manner obvious and well known to those skilled in lens design.

My sound pick-up unit may be adjusted in a fixture prior to being inserted into the projector, or it may be adjusted with equal ease while in operating position on the aperture unit. In either case, the exciter lamp is inserted into its socket and clamped, by tightening knurled headed clamp screw 69, in the position which brings the center of the filament on the level of the axis of the exciter optical system. If the coil filament is slightly off center lengthwise, it can be quickly centered by loosening lock screw 53 and swinging insulating block 48 slightly with respect to exciter lamp bracket 41. If coil filament 70 appears to be slightly tilted with respect to opening 81 in diaphragm member 80, it may be squared by loosening knurled headed clamp screw 44 and turning the adjusting screw 60 by means of knurled wheel 62. The correct adjustment is obtained when the scanning line, as viewed on the sound track, is exactly horizontal, i. e., at right angles to the edge of the film strip. When this adjustment is completed, exciter lamp bracket 41 is locked against turning on focusing bracket 32, by tightening knurled headed clamp screw 44. The foregoing adjustments, relating specifically to the exciter lamp, are necessitated by variations in relative position of filament and base which occur in the commercial run of exciter lamps.

The remaining adjustment, namely focusing of the scanning line, is accomplished in a way quite novel in exciter systems. It has been noted that the objective is fixed in the exciter tube, and that the distance from the objective to the film position on the aperture plate is likewise non-adjustable, being established, once for all, when the sound pick-up unit is assembled. Focusing by moving the objective, is rather difficult and generally not entirely satisfactory because a movement of one one-thousandth of an inch may make a critical change in definition, and an accidental shifting of the adjustment to an even greater amount may, and often does occur when tightening the locking device on ordinary sound systems. In my device, the longer optical distance, i. e., the spacing between filament and objective, is made adjustable, and a variation of several thousandths of an inch therein has but slight effect on the definition of the scanning line. In this manner I have made focusing, which is essentially an exact operation, easy of accomplishment, and have entirely eliminated the possibility of accidentally shifting the focus when locking the adjustable member. To focus my device, the knurled headed clamp screw 37 is loosened and the focusing screw 38 is turned by inserting a screw driver into the slot in its head 39, while observing the scanning line either through a suitable microscope or by means of a high frequency test film. When the focus is correct, clamp screw 37 is again tightened.

Although I have herein described an improved exciter optical system employing cylindrical faces at all refracting surfaces, the general arrangement of essential elements in the sound pick-up unit is the same as described in Letters Patent of the United States No. 2,036,275, dated April 7, 1936. It is obvious, therefore, that my former sphero-cylindrical condenser and objective system may be used in the present exciter tube either by forming the lenses to fit the present lens mounts or by providing suitable means in the exciter tube for mounting the lens elements described in the above mentioned application.

My device is simple, compact, easily adjusted, and inexpensive to manufacture. The unit construction offers many obvious advantages, both from the manufacturing and operating standpoint, and it is uniquely adapted for use with the aperture unit of a continuous projector. Moreover, its optical system, comprising cylindrical surfaces only, insures improved performance. Its position on the aperture unit of a continuous projector over which the movement of the film strip is controlled entirely through tension applied by sprockets having a balancing effect, each on the other, insures further improvement in tone quality and increased frequency range, thereby adding materially to the enjoyment furnished by sound motion pictures.

I have described but one form of my device, but my invention may, by obvious expedients, be easily adapted to other types of projecting machines, and essential parts thereof may be used effectively and to great advantage in association with apparatus for recording and duplicating sound records. The appended claims are drawn to cover any and all applications of my device or of any parts thereof regardless of the type of apparatus wherein they may be used.

Having thus fully described my invention, what I claim is:

1. In a sound pick-up unit of the character specified, an exciter system supporting member having an integral annular portion adapted to fit within the aperture unit of a sound film projector and arranged to house a light-sensitive cell.

2. In a sound pick-up unit of the character specified, an exciter system supporting member having an integral annular portion paralleling the exciter system, said integral annular portion being adapted to house a light-sensitive cell and arranged to fit within the aperture unit of a sound film projector.

3. In a sound pick-up unit of the character specified, an exciter system supporting member having an integral annular portion adapted and arranged to house a light-sensitive cell, said supporting member being provided with screw means for focusing said exciter system and guide means for maintaining alignment thereof during focusing.

4. In a sound pick-up unit of the character specified, an exciter system supporting member having an integral annular portion and a base mounted therein and adapted and arranged to support and make electrical connection with a photo-electric cell housed within said supporting member.

5. In a sound pick-up unit of the character specified, a supporting member having an integral annular portion adapted and arranged to fit within a sound film projector aperture unit and to house a light-sensitive cell, a bore in the opposite end of said supporting member parallel to said integral annular portion, and an exciter tube fixed within said bore and adapted and arranged at one end to support an objective in alignment with said light-sensitive cell.

6. In a sound pick-up unit of the character specified, a supporting member having an integral annular portion adapted and arranged to fit within a sound film projector aperture unit and to house a light-sensitive cell, a bore in the opposite end of said supporting member parallel to said integral annular portion, an exciter tube fixed within said bore and adapted and arranged at one end to support an objective in alignment with said light-sensitive cell, a focusing bracket slidably mounted upon the other end of said exciter tube, screw means and guide means mounted on said supporting member and adapted and arranged to slide said focusing bracket and maintain the alignment thereof upon said exciter tube.

7. In a sound pick-up unit of the character specified, a supporting member adapted and arranged to house and definitely position a light-sensitive cell, an exciter tube fixed within said supporting member, an objective mounted in fixed position within said exciter tube and in alignment with said light-sensitive cell, a focusing bracket slidably mounted upon said exciter tube, and means mounted on said focusing bracket for supporting a filament lamp in alignment with the axis of said exciter tube.

8. In a sound pick-up unit of the character specified, a supporting member fixed on a sound aperture unit, an exciter tube fixed in said supporting member, an objective fixedly mounted in said exciter tube in alignment with the sound aperture, a focusing bracket slidably mounted upon said exciter tube, an exciter lamp bracket hingedly mounted on said focusing bracket, an insulating block hingedly mounted upon the free end of said exciter lamp bracket, and an exciter lamp socket secured to said insulating block.

9. In a sound pick-up unit of the character specified, a supporting member fixed on a sound aperture unit, an exciter tube fixed in said supporting member, a crossed cylinder objective having but two refracting surfaces, said objective being fixed in said exciter tube, a focusing bracket slidably mounted upon said exciter tube, an exciter lamp bracket hingedly mounted on said focusing bracket, and hinged means attached to the free end of said exciter lamp bracket adapted and arranged to support a filament exciter lamp in alignment with said exciter tube.

10. In a sound pick-up unit of the character specified, an exciter tube fixed with respect to a sound aperture unit, a crossed cylinder objective fixed at one end of said exciter tube in alignment with the sound aperture, a focusing bracket slidably mounted on said exciter tube, a crossed cylinder condenser mounted within said focusing bracket in alignment with said crossed cylinder objective, and double hinged means carried on said focusing bracket and adapted and arranged to support a filament exciter lamp in alignment with said objective.

11. In a sound pick-up unit of the character specified, an exciter tube fixed with respect to a sound aperture unit, a crossed cylinder objective having but two refracting surfaces, said objective being fixed in said exciter tube, a single coil filament light source, hinged means for supporting said light source, and a focusing bracket slidably mounted upon said exciter tube and hingedly supporting said hinged means.

12. In a sound pick-up unit of the character specified, an exciter tube, a crossed cylinder objective fixed in one end of said exciter tube, said crossed cylinder objective having but two refracting surfaces and these being of unequal power, the surface of higher refracting power facing outwardly from said exciter tube.

13. In a sound pick-up unit of the character specified, an exciter tube, a crossed cylinder objective fixed in one end of said exciter tube, said crossed cylinder objective having but two refracting surfaces and these being of unequal power, the surface of higher refracting power facing outwardly from said exciter tube, and a crossed cylinder condenser mounted symmetrically with respect to said objective at the opposite end of said exciter tube, said crossed cylinder condenser also having but two refracting surfaces.

14. In a sound pick-up unit of the character specified, an exciter tube, a crossed cylinder objective fixed in one end of said exciter tube, said crossed cylinder objective having but two refracting surfaces and these being of unequal power, the surface of higher refracting power facing outwardly from said exciter tube, a crossed cylinder condenser mounted symmetrically with respect to said objective at the opposite end of said exciter tube, said crossed cylinder condenser also having but two refracting surfaces, and a diaphragm associated with said condenser, said diaphragm containing a long narrow opening and acting as a field stop for said crossed cylinder objective.

15. In a sound motion picture projector, an aperture unit including a curved aperture plate containing a sound aperture, a sound pick-up unit including a supporting member, a light-sensitive cell, an exciter lamp and optical system carried on said supporting member, and means for retaining a film strip in contact with said aperture plate while propelling the same continuously thereover, said means comprising a film actuating means positioned below said aperture unit and a film drag means positioned above said aperture unit.

16. In a sound motion picture projector, a slidably mounted aperture unit including a curved aperture plate containing sound and picture apertures, a sound pick-up unit mounted on said aperture unit including a supporting member, a light-sensitive cell, an exciter lamp and optical system carried on said supporting member, and means for retaining a film strip in contact with said aperture plate while propelling the same continuously thereover, said means comprising a film actuating means positioned below said aperture unit and a film drag means positioned above said aperture unit, said drag means including a film actuated sprocket.

17. In a sound film projector of the character specified, an aperture unit including a curved aperture plate containing a sound aperture, said aperture unit being slidably mounted for adjustment along the optical axis of said projector, means for propelling a film strip continuously thereover, means independent of said aperture unit for applying tension upon said film strip thereby retaining said film strip in contact with said aperture plate, and a sound pick-up unit mounted directly upon said slidably mounted aperture unit.

18. In a sound film projector, a slidably mounted aperture unit including a curved aperture plate containing a sound aperture, means for propelling a film strip continuously thereover under tension, thereby retaining said film strip in contact with said aperture plate, and a sound pick-up unit comprising a light-sensitive cell, an exciter system and a common supporting member, said sound pick-up unit being removably mounted upon said aperture unit and arranged for pre-focusing in a suitable fixture.

19. In a sound film projector, a slidably mounted aperture unit including a curved aperture plate containing sound and picture apertures, means for propelling a film strip continuously thereover under tension thereby retaining said film strip in contact with said aperture plate, said means comprising a power driven feed sprocket and a film actuated sprocket, and a complete prefocussed sound pick-up unit adapted and arranged for precise positioning within said aperture unit.

ARTHUR J. HOLMAN.